United States Patent [19]

Esthimer

[11] 4,289,222
[45] Sep. 15, 1981

[54] ENGINE-CLUTCH CONTROL INTERLOCK SYSTEM

[75] Inventor: William F. Esthimer, Walpole, Mass.

[73] Assignee: Bird-Johnson Company, Walpole, Mass.

[21] Appl. No.: 79,595

[22] Filed: Sep. 27, 1979

[51] Int. Cl.³ .............................................. B60K 41/02
[52] U.S. Cl. .............................. 192/0.033; 192/0.076; 192/0.096; 192/3.58
[58] Field of Search ............... 192/0.076, 0.096, 0.048, 192/3.58, 103 R, 3.63, 0.033

[56] References Cited

U.S. PATENT DOCUMENTS

| | | | |
|---|---|---|---|
| 2,788,872 | 4/1957 | Winther | 192/0.075 X |
| 2,944,645 | 7/1960 | Markham | 192/0.096 X |
| 3,177,992 | 4/1965 | Ayers | 192/0.096 |
| 3,244,262 | 4/1966 | Heidner | 192/0.096 |
| 3,273,679 | 9/1966 | Uher | 192/3.58 X |

FOREIGN PATENT DOCUMENTS 976104  11/1964  United Kingdom ............. 192/0.096

*Primary Examiner*—George H. Krizmanich
*Attorney, Agent, or Firm*—Brumbaugh, Graves, Donohue & Raymond

[57] ABSTRACT

Possible damage to a clutch caused by engagement or disengagement when the engine is running at a high speed is prevented by an engine-clutch control interlock system which prevents the clutch from being engaged or disengaged except when the engine is running at a speed below a nominal, selected idle speed. The system comprises an engine speed monitor which produces a speed signal indicative of whether the engine is running above or below the selected idle speed, a clutch control monitor which produces a signal indicative of whether or not a clutch actuator control signal is being generated and a clutch status monitor which produces a signal indicative of whether the clutch is engaged or disengaged. A clutch actuator signal is conducted to the clutch either to engage or disengage it only when the monitors indicate that a clutch control signal is being generated and the engine is running below the nominal idle speed. A speed control signal is conducted to the engine speed controller only when the clutch status monitor indicates that a disengaged clutch has engaged.

3 Claims, 2 Drawing Figures

ENGINE-CLUTCH CONTROL INTERLOCK SYSTEM

The present invention relates to the control of a power train which includes an engine driving a load through a clutch and, in particular, to interlocking the control of the engine speed and the engagement or disengagement of the clutch to prevent damage that might occur should the clutch be engaged or disengaged when the engine is running at a speed that is not close to idle.

BACKGROUND OF THE INVENTION

Many types of clutches, particularly those used in power trains driven by very powerful engines, for example, marine propeller and bow thruster drives, can be damaged by engaging or disengaging the clutch (or clutches) at other than speeds close to idle. The possibility of damage is especially great when full engine speed is commanded and a reversible type clutch system is to be changed from engagement to drive the output in one direction to engagement to drive the output in the other direction. For example, assume that a bow thruster is commanded to go from full speed port to full speed starboard. The movement of the engine-clutch controller from full engine speed and port clutch to full engine speed and starboard clutch initiates a control sequence which is supposed to reduce the engine speed to idle, to cause the port clutch to disengage and the starboard clutch to engage and then accelerate the engine back to full speed.

Presently known systems are either pneumatic or hydraulic or a combination of both and rely on timing of the sequence of operations in that it is assumed that at the end of a certain time duration a particular step in the sequence has taken place. Generally, the time delays between the various operations are obtained by using long coils of tubing (or other storage volume) and throttling orifices to delay the conduction of pneumatic or hydraulic signals to the controlled elements. Among the disadvantages of presently known systems are the need for long time delays to be built into the systems to ensure that the operations inferred to have occurred within a certain time duration have in fact occurred. Notwithstanding the provision of large time delays, there is no certainty that an operation that was to have occurred within a certain time did in fact occur, and the next operation in the time control sequence may take place based on the false assumption that a previously required operation had occurred. For example, the engine speed may not have in fact dropped to idle for one reason or another, but the change from one clutch to the other will take place, because, apart from time, initiation of the clutch change is controlled without regard to engine speed. The commonly used coils of tubing are physically cumbersome and often difficult to maintain in good condition, and the time delay orifices are susceptible to dirt contamination and consequent malfunction.

SUMMARY OF THE INVENTION

There is provided, in accordance with the present invention, an engine-clutch control interlock system which, except for the one minor aspect of the control sequence (which, in fact, can readily be modified, if desired) completely eliminates time delay as a basis for controlling the sequence of operations of an engine and clutch. Instead, the system operates by monitoring engine speed and clutch status and providing a specific logic for ensuring that each operation takes place only if certain conditions exist, as follows:

1. The engine speed must be below a nominal selected idle speed before a clutch disengages;
2. The engine speed must be below the selected idle speed before a clutch engages;
3. If a disengaged clutch is to be engaged, the engine speed cannot be increased above idle until after the clutch is engaged.

The interlock system comprises an engine speed monitor which produces a speed signal indicative of whether the engine is running above or below a selected nominal idle speed, which may be a speed somewhat above actual idle speed selected in the light of the engineer's judgment of the speed at which a clutch may be engaged or disengaged without damage or other adverse consequences. A clutch actuator monitor detects the operating status of the clutch actuator and produces a signal indicative of whether the clutch actuator is engaged or at neutral. The clutch control signal is monitored, and a signal is produced indicative of whether or not a clutch signal is being generated. The three modes described above are ensured by direct monitoring of engine speed, clutch actuator status and clutch control status.

In particular, the engine speed monitor, clutch control signal monitor and clutch actuator status monitor are connected into a logic circuit which may be composed of electrical, electronic, pneumatic or hydraulic components or combinations thereof. The logic circuit responds to the monitors and controls the engine and clutch in accordance with the three above-stated conditions. The logic circuit comprises (1) means responsive to the clutch control status signal and the speed signal for conducting the clutch actuator signal to the clutch control of a disengaged clutch only when a clutch control signal is being generated and the engine is running below the nominal idle speed and (2) means responsive to the clutch actuator status signal for permitting a speed signal to be conducted to the engine speed control means only when the clutch is engaged. The circuit further includes means responsive to the speed signal for maintaining a clutch actuator signal as long as the engine is running at a speed above the nominal idle speed, even though the clutch control signal is terminated, and for terminating the clutch actuator signal only when the engine speed falls below the nominal idle speed, provided no clutch control signal is generated when the engine speed so falls.

Preferably, means is provided for maintaining conduction of a clutch actuator signal to the clutch, even though the clutch control signal is terminated and then restored, as long as the engine speed does not fall below nominal idle speed while the clutch control signal is terminated. This "latching" feature holds the clutch engaged even if the pilot should briefly move the speed control below nominal idle and neutral or to the other clutch and then move it back above idle and call for the still-engaged clutch.

For a better understanding of the invention, reference may be made to the following description of an exemplary embodiment, taken in conjunction with the figures of the accompanying drawings.

DESCRIPTION OF EXEMPLARY EMBODIMENT

Figure 1:
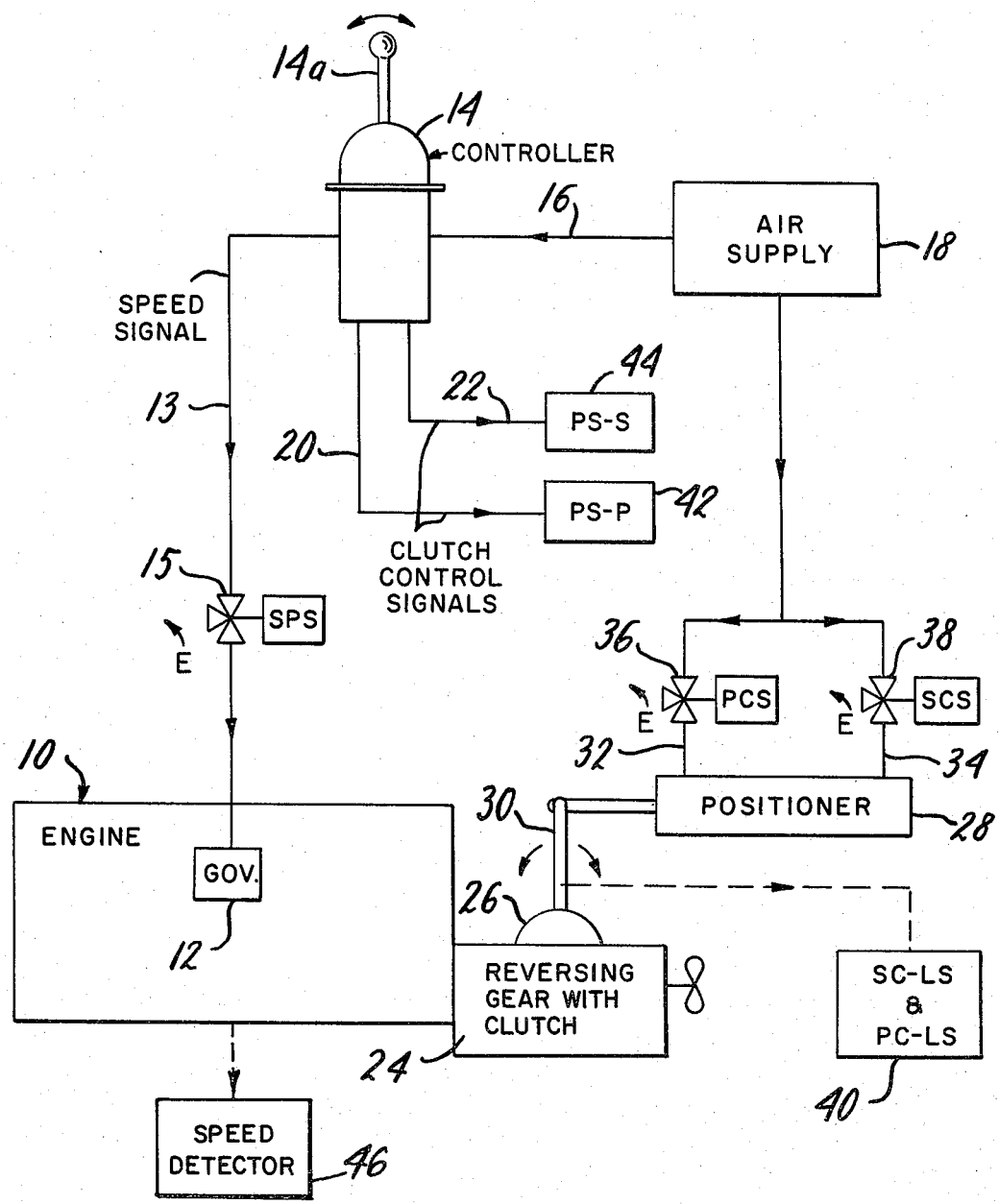
FIG. 1 is a schematic diagram of the drive train and some of the components of the engine-clutch interlock control.

The embodiment shown in the drawings is a ship bow thruster, but it will be readily apparent to those skilled in the art that the control system is equally applicable to a ship propulsion and to other power trains which have a variable speed engine and a clutch.

The bow thruster comprises a diesel engine 10 having a governor 12 which controls the engine speed in accordance with a variable pneumatic speed control signal selectively delivered through a line 13, depending upon the status of a three-way solenoid valve 15 (SPS for "speed signal") from a controller 14 located at each thruster control station—in practice there are often two or more such stations on a ship—and connected by a line 16 to an air supply 18 (a source of clean, dry air under pressure). The controller 14 also selectively delivers a pneumatic clutch control signal to one of the lines 20 and 22 depending upon the position of the control lever 14a. In the neutral position of the lever, no speed or clutch signals are delivered. Pushing the control level to the left produces a speed signal in the line 13 (the magnitude of which depends on how far to the left the lever is set) and produces a port clutch control signal in the line 20. Similarly, pushing the lever to the right produces a speed signal and a starboard clutch control signal in the line 22.

The thruster power train further includes a reversing gear 24 having a hydraulic clutch for each direction of output shaft rotation. The clutches are engaged and disengaged by a control valve 26 which, in turn, is operated by a three-position pneumatic positioner 28 via a valve control lever 30. The positioner selectively receives a pneumatic port clutch signal through a line 32 or a pneumatic starboard clutch signal through a line 34 or no signal and responds by setting the control lever 30 of the clutch control valve 26 to engage the port clutch, engage the starboard clutch or leave both clutches disengaged, respectively. Conduction (or lack thereof) of clutch control signals to the positioner is controlled by three-way solenoid valves 36 ("PCS" for "port clutch signal") and 38 ("SCS" for "starboard clutch signal") which, when de-energized, are closed to the air supply 18 and open to exhaust. The status of each clutch is monitored by limit switches 40 which detect the position of the control lever 30 of the clutch control valve 28—closing of the port switch ("PC-LS" for "port clutch-limit switch") or of the starboard switch ("SC-LS") generates a corresponding electrical signal indicative of clutch actuator status for a purpose described fully below. The clutch control solenoid valves 36 and 38 are responsive in part to electrical signals from corresponding pressure switches 42 ("PS-P" for "pressure switch-port") and 44 ("PS-S") connected to the lines 20 and 22.

Figure 2:
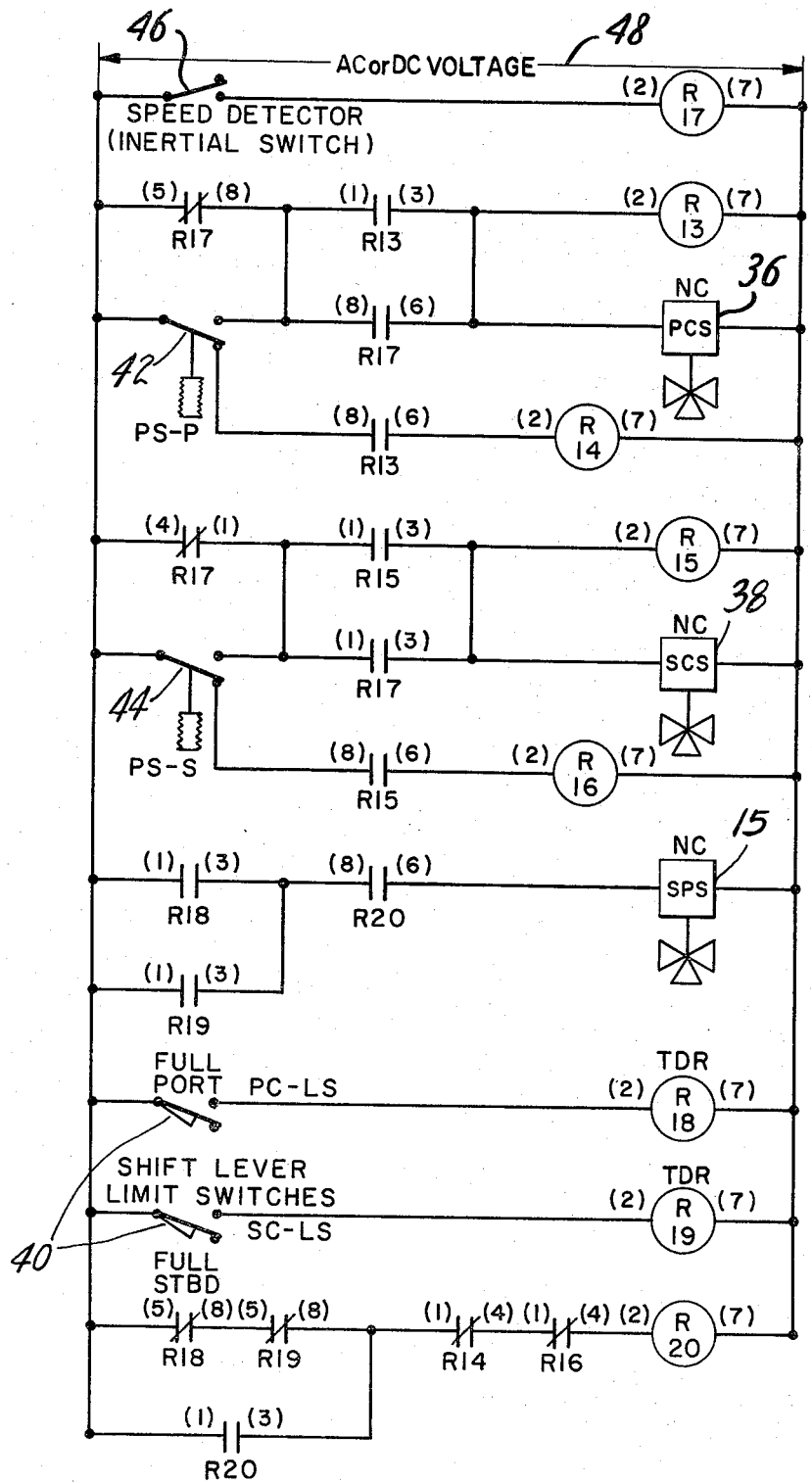
FIG. 2 is a schematic diagram of a logic circuit which controls the engine speed and clutch actuator command signals.

The electrical switches and solenoid valves described above are wired into the control circuit shown in FIG. 2, the makeup of which can most conveniently be described by going through one operating mode. Let us begin with the engine at idle and both clutches disengaged.

The engine speed is monitored by a speed detector, preferably an inertial switch 46 which is closed when the engine is running at a nominal idle speed (say 50 rpm above true idle speed) below which the clutches can be engaged or disengaged with no risk of harm. The closed switch completes a circuit across a suitable power supply 48 (e.g., 115 V) to the coil (leads 2-7) of a relay R17, thereby opening the normally closed contacts 5-8 and 4-1 and closing contacts 8-6 and 1-3 of that relay R17. At this point, the status of the switches and valves of the pneumatic part of the control interlock system is as follows:

Valve PCS (port clutch solenoid) and valve SCS (starboard clutch solenoid) are de-energized and closed, because the networks which connect them across the power supply are open (the open contacts 5-8 and 4-1 and the status of the pressure switches PS-P and PS-S); and Valve SPS (speed solenoid) is de-energized and closed, inasmuch as contacts 1-3 of relay R18 and contacts 1-3 of relay R19 are open - the coils of R18 and R19 are in series with the clutch position detector limit switches PC-LS and SC-LS which are both open.

Therefore, no clutch signals can at this point be delivered (through PS-S or PS-P) to the clutches and no speed signal can reach the engine governor through SPS.

Let us next assume that the operator calls for port thrust at full speed by pushing the control lever 14a of the controller all the way to the left (see FIG. 1). The speed signal will be present in the line 13 but is stopped by the valve SPS. The port clutch signal will enter line 20 and transfer the pressure switch 42 (i.e., PS-P), thereby completing a circuit across the then-closed contacts 8-6 of R17 and the port clutch solenoid valve 36 (PSC). The energized valve PSC opens and conducts a clutch control signal to the positioner 28 which shifts the clutch control valve to engage the port clutch of the reversing gear 24. Full engagement of the clutch takes two or three seconds. The control circuit shown in the drawings does not provide for monitoring actual clutch engagement but operates by inferring that within a selected time delay after the clutch lever 30 is shifted to engage a clutch, the clutch will be engaged.

More particularly, when the lever 30 has moved to a position opening the control valve to engage the port clutch, the limit switch PC-LS closes to complete a circuit across the coil (leads 2-7) of a time delay relay R18, thereby closing contacts 1-3. As described immediately below, the contacts 8-6 of relay R20 were previously closed and latched when the port pressure switch PS-P cycled. Therefore, a circuit is completed across the speed solenoid valve SPS through relay R18 contacts 1-3 and relay R20 contacts 8-6. The valve SPS opens and allows the speed signal to reach the governor. Thus, the speed signal cannot reach the governor until the clutch is engaged. The action by inference of the time delay relay R18 can be eliminated by providing a pressure switch on the hydraulic line of the port clutch in series with the speed signal solenoid valve, thereby permitting that valve to open only when the line is under pressure.

The circuit components associated with the port clutch solenoid valve 36 are duplicated in association with the starboard clutch solenoid valve. It seems unnecessary to describe those components or their mode of operation.

The normally closed relay contacts in series with the coil (leads 2-7) of relay 20 complete a circuit that energizes the relay 20 and closes the contacts 8-6 in series with the speed signal solenoid valve SPS. The relay R20 is latched in by its contacts 1-3 so that even though the normally closed contacts 5-8 of the time delay relay R18 open soon after the limit switch PC-LS closes, the speed signal solenoid valve SPS (15) remains open.

The port clutch is now engaged and the engine receives the speed signal. As soon as the engine speed exceeds the selected nominal idle speed, the inertial switch 46 opens, thereby de-energizing the relay R17. To backtrack again, when the pressure switch cycled to energize the port clutch solenoid valve PCS, it also completed a circuit across a relay R13 (coil leads 2-7) and latched a circuit path in parallel with the contacts 8-6 of relay R17 to the solenoid valve PCS. Therefore, even though the contacts 8-6 of relay 17 open when the engine speed moves above nominal idle, the valve PCS remains energized by a circuit through the pressure switch PS-P, and contacts 1-3 of R13. Contacts 8-6 of R13 are also closed, but R14 remains de-energized because PS-P is open with respect to R14.

When the controller is moved back to neutral, the following sequence occurs:

1. The speed signal and clutch control signal are terminated (by the controller 14);
2. PS-P transfers to open from the network that includes contacts R13, 1-3 and R17, 8-6 and close to contacts R13, 8-6;
3. R14 is energized via switch PS-P and contacts R13, 8-6 (latched via normally closed contacts R17, 5-8 and R13, 1-3);
4. normally closed contacts R14, 1-4 open, breaking the circuit across R20;
5. contacts R20, 8-6 open, breaking the circuit to the speed signal solenoid SPS and unlatching R20 (contacts R20, 1-3)—at this point if the operator were to move the control and call for engine speed and either clutch, the speed signal is closed from the governor, because the valve SPS is de-energized and closed. Contacts R14, 1-4 stay open until R13 is de-energized, which will not occur until the engine speed drops below nominal idle and R17 is energized to open contacts R17, 5-8 as long as PS-P stays closed to contacts R13, 8-6 and R14;
6. the port clutch solenoid valve remains open and keeps the port clutch engaged (regardless of what speed and direction the operator might call for) until the engine speed drops below nominal idle and R17 is energized and the operator does not call for port clutch. If the operator calls for port clutch and engine speed above idle before the engine speed drops below nominal idle, the port clutch will remain engaged (circuit through PS-P and contacts R13, 1-3), and the speed signal solenoid will reopen, because R14 is de-energized and contacts R14, 1-4 reclose, thus re-energizing R20 and closing contacts R20, 8-6 to restore current to valve SPS via R18, 1-3;
7. If the controller remains at neutral long enough for engine speed to drop below nominal idle, the inertial switch closes, thus de-energizing relay R17, closing contacts R17, 5-8 and R17, 4-1 and opening contacts R17, 8-6 and R17, 1-3. If no clutch is commanded at the controller, the pressure switch PS-P and its starboard counterpart PS-S are open with respect to the clutch solenoid valves PCS and SCS. The previously engaged port clutch disengages upon de-energization of the valve PSC and restoration of the positioner 28 to the neutral position, which opens the limit switch PC-LS.

If the operator moves the controller rapidly from a speed setting above nominal idle and port clutch to a speed setting above nominal idle and starboard clutch, the circuit will cycle through the sequence described above until the engine is at idle and the port clutch is disengaged, at which point the starboard counterparts of the port elements will control starboard clutch engagement and disengagement and engine speed such that the engine will not run up until the starboard clutch is engaged and the starboard clutch will not disengage until the engine is at idle.

In summary, the embodiment of an engine and clutch control interlock system, according to the present invention, shown in the drawings and described in detail above, comprises means in the form of a speed detector (inertial switch) for monitoring engine speed and producing a speed signal indicative of whether the engine is running at a speed above or below a selected nominal idle speed, means in the form of a pneumatic controller 14 and a pressure switch (either of the switches 42 and 44) for generating and monitoring a clutch control signal and producing a clutch control status signal indicative of whether or not a clutch control signal is being generated; means in the form of a limit switch 40 for monitoring the operating status of the clutch and producing a clutch status signal indicative of whether the clutch is engaged or disengaged; means in the form of relays R13, R14 and R17 for the port clutch and relays R15, R16 and R17 for the starboard clutch responsive to the clutch control status signal and the speed signal for conducting the clutch actuator signal to the clutch control means of a disengaged clutch only when a clutch control signal is generated and the engine is running below the nominal idle speed; and means in the form of relays R18 or R19 responsive to the clutch status signal for permitting a speed control signal to be conducted to speed control means only after the clutch is engaged.

There are, of course, pneumatic and electronic equivalents to many of the electrical relays and switches of the embodiment, and substitutions of such equivalents, as well as other modifications and variations of the embodiment described above and shown in the drawings, will be readily apparent to those skilled in the art. All such variations and modifications are intended to be included within the scope of the invention as defined in the appended claims.

I claim:

1. In a power train that includes an engine having an engine speed control means for controlling the speed of the engine in response to an engine speed control signal generated and selectively conducted to the speed controller and a clutch having a clutch control means for engaging and disengaging the clutch in response to a clutch actuator signal, an engine and clutch control interlock system comprising means for monitoring engine speed and producing a speed signal indicative of whether the engine is running at a speed above or below a selected nominal idle speed; means for generating and monitoring a clutch control signal and producing a clutch control status signal indicative of whether or not a clutch control signal is being generated; means for monitoring the operating status of the clutch and producing a clutch status signal indicative of whether the clutch is engaged or disengaged; means responsive to the clutch control status signal and the speed signal for conducting the clutch actuator signal to the clutch control means of a disengaged clutch only when a clutch control signal is generated and the engine is running below the nominal idle speed; and means responsive to the clutch status signal for permitting a speed control signal to be conducted to the speed control means only after the clutch is engaged.

2. An engine and clutch control interlock system according to claim 1 and further comprising means responsive to the speed signal for continuing the conduction of a clutch actuator signal to the clutch control means as long as the engine is running at a speed above the nominal idle speed, even though the clutch control signal is terminated, and for terminating conduction of a clutch actuator signal to the clutch control means when the engine speed falls below nominal idle speed, provided no clutch control signal is being generated when the engine speed so falls.

3. An engine and clutch control interlock system according to claim 2 and further comprising means for maintaining conduction of a clutch actuator signal to the clutch control means, even though the clutch control signal is terminated and then restored, as long as the engine speed does not fall below nominal idle while the clutch control signal is terminated.

* * * * *